(12) United States Patent
Nambi Raj et al.

(10) Patent No.: US 9,961,588 B2
(45) Date of Patent: May 1, 2018

(54) METHODS, SYSTEMS, AND COMPUTER READABLE MEDIA FOR DISTRIBUTING MONITORED NETWORK TRAFFIC

(71) Applicant: Ixia, Calabasas, CA (US)

(72) Inventors: Avinash Raj Nambi Raj, Woodbury, MN (US); Alan Richard Schwenk, Raleigh, NC (US); Gabriel Chiriacescu, Cary, NC (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 108 days.

(21) Appl. No.: 15/052,812

(22) Filed: Feb. 24, 2016

(65) Prior Publication Data

US 2017/0245175 A1    Aug. 24, 2017

(51) Int. Cl.
*H04W 28/08* (2009.01)
*H04W 24/08* (2009.01)

(52) U.S. Cl.
CPC .......... *H04W 28/08* (2013.01); *H04W 24/08* (2013.01)

(58) Field of Classification Search
CPC .............................. H04W 28/08; H04W 24/08
See application file for complete search history.

(56) References Cited

U.S. PATENT DOCUMENTS

| | | | |
|---|---|---|---|
| 7,710,966 B1 | 5/2010 | Biro et al. | |
| 8,036,230 B2 | 10/2011 | Gray et al. | |
| 8,804,716 B2 | 8/2014 | Bulboaca et al. | |
| 8,929,356 B2 | 1/2015 | Pandey et al. | |
| 9,655,026 B2 | 5/2017 | Bondrescu et al. | |
| 9,686,675 B2* | 6/2017 | Ketheesan | H04W 8/26 |
| 2006/0256720 A1 | 11/2006 | Curran-Gray et al. | |
| 2007/0258465 A1* | 11/2007 | Ma | H04W 28/08 370/395.53 |
| 2008/0139207 A1 | 6/2008 | Son et al. | |
| 2008/0219229 A1 | 9/2008 | Zheng | |
| 2009/0175333 A1 | 7/2009 | Hsiang | |
| 2010/0103862 A1 | 4/2010 | Ulupinar et al. | |
| 2010/0189103 A1 | 7/2010 | Bachmann et al. | |
| 2011/0150211 A1* | 6/2011 | Anderson | H04L 63/30 380/1 |
| 2012/0063300 A1 | 3/2012 | Sahin et al. | |

(Continued)

FOREIGN PATENT DOCUMENTS

EP       2 654 340 A1    10/2013

OTHER PUBLICATIONS

Notification of Transmittal of the International Search Report and the Written Opinion of the International Searching Authority, of the Declaration for the International Application No. PCT/US2017/012740 (Apr. 21, 2017).

(Continued)

*Primary Examiner* — Hashim Bhatti

(57) ABSTRACT

The subject matter described herein relates to methods, systems, and computer readable media for test system connection resiliency. In some examples, a method for distributing monitored network traffic includes monitoring S1-MME traffic and S6a traffic in a core network of a telecommunications network. The method includes decrypting encrypted S1-MME traffic using information extracted from the S6a traffic. The method includes load balancing between a plurality of monitoring nodes using the decrypted S1-MME traffic.

11 Claims, 5 Drawing Sheets

(56) References Cited

U.S. PATENT DOCUMENTS

| | | | | |
|---|---|---|---|---|
| 2012/0155324 | A1* | 6/2012 | Janakiraman | H04L 41/12 370/254 |
| 2012/0159151 | A1* | 6/2012 | Janakiraman | H04L 43/028 713/153 |
| 2012/0213073 | A1 | 8/2012 | Ang et al. | |
| 2013/0031271 | A1 | 1/2013 | Bosch et al. | |
| 2013/0269001 | A1* | 10/2013 | Janakiraman | H04L 43/028 726/4 |
| 2013/0272127 | A1* | 10/2013 | Ali | H04W 76/022 370/235 |
| 2013/0287021 | A1 | 10/2013 | Bulboaca et al. | |
| 2014/0003333 | A1* | 1/2014 | Ivershen | H04W 24/08 370/328 |
| 2014/0025800 | A1 | 1/2014 | Sharma | |
| 2014/0086068 | A1 | 3/2014 | Borsos et al. | |
| 2014/0321278 | A1* | 10/2014 | Cafarelli | H04L 47/2441 370/235 |
| 2015/0036513 | A1* | 2/2015 | Bukin | H04L 43/12 370/250 |
| 2015/0043353 | A1 | 2/2015 | Javed | |
| 2015/0304196 | A1* | 10/2015 | Sun | H04L 43/0876 709/219 |
| 2015/0373773 | A1* | 12/2015 | Ainali | H04W 24/02 455/411 |
| 2016/0007392 | A1 | 1/2016 | Bondrescu et al. | |
| 2017/0161109 | A1* | 6/2017 | Khojastepour | G06F 9/505 |

OTHER PUBLICATIONS

Corrected Notice of Allowability for U.S. Appl. No. 14/325,341 (dated Feb. 2, 2017).

Notice of Allowance and Fee (s) Due, Examiner-Initiated Interview Summary, and Notice of Decision from Post-Prosecution Pilot Program (P3) Conference for U.S. Appl. No. 14/325,341 (dated Jan. 13, 2017).

Final Office Action for U.S. Appl. No. 14/325,341 (dated Aug. 12, 2016).

Non-Final Office Action for U.S. Appl. No. 14/325,341 (dated Feb. 2, 2016).

"3rd Generation Partnership Project; Technical Specification Group Core Network and Terminals; Numbering, addressing and identification (Release 11)," 3GPP TS 23.003 V11.9.0, pp. 1-84 (Sep. 2014).

"3rd Generation Partnership Project; Technical Specification Group Services and System Aspects; General Packet Radio Service (GPRS) enhancements for Evolved Universal Terrestrial Radio Access Network (E-UTRAN) access (Release 11)," 3 GPP TS 23.401 V11.10.0, pp. 1-286 (Jun. 2014).

"Load-Balancing Algorithms," IP Switching Cisco Express Forwarding Configuration Guide, Cisco IOS XE Release 3S, http://www.cisco.com/c/en/us/td/docs/ios-xml/ios/ipswitch_cef/configuration/xe-3s/isw-cef-xe-3s-book/isw-cef-load-balancing.html#concept_3C8798DC060D459F8605C293F4834D3A, pp. 1-2 (Publication Date Unknown, downloaded from the Internet May 12, 2014).

Notice of Allowance and Fee(s) Due for U.S. Appl. No. 13/458,602 (dated Apr. 1, 2014).

Applicant-Initiated Interview Summary for U.S. Appl. No. 13/458,602 (dated Feb. 21, 2014).

Non-Final Office Action for U.S. Appl. No. 13/458,602 (dated Oct. 18, 2013).

3rd Generation Partnership Project; Technical Specification Group Services and System Aspects; 3GPP System Architecture Evolution (SAE); Security architecure (Release 11), 3GPP TS 33.401 V11.7.0, pp. 1-121 (Jun. 2013).

Notice of Allowance and Fee(s) Due, Examiner-Initiated Interview Summary, and Notice of Decision from Post-Prosecution Pilot Program (P3) Conference for U.S. Appl. No. 14/325,341 (dated Jan. 13, 2017).

* cited by examiner

METHODS, SYSTEMS, AND COMPUTER READABLE MEDIA FOR DISTRIBUTING MONITORED NETWORK TRAFFIC

TECHNICAL FIELD

The subject matter described herein relates generally to distributing monitored network traffic. More particularly, the subject matter described herein relates to methods, systems, and computer readable media for load balancing between monitoring nodes at a monitoring node load balancer.

BACKGROUND

Network analysis tools are used within communication networks to monitor network traffic and to detect events, such as undesired network intrusions. When multiple network analysis tools are being utilized in parallel to monitor network traffic, it can be desirable to load balance the monitored network traffic among the network analysis tools, e.g., so that some network analysis tools do not get overloaded while others are underutilized. Further, network analysis tools can be configured to receive all packets associated with a particular communication session for a mobile user device in order to enhance the ability of the network analysis tool to provide effective monitoring of the network traffic. For example, as mobile user equipment moves through a communication network, it can be useful for all the network traffic associated with that user equipment to be identified and forwarded to the same network analysis tool. This may be difficult to achieve, for example, for load balanced systems when mobile user devices can use different identifiers at different times.

SUMMARY

The subject matter described herein relates to methods, systems, and computer readable media for test system connection resiliency. In some examples, a method for distributing monitored network traffic includes monitoring S1-MME traffic and S6a traffic in a core network of a telecommunications network. The method includes decrypting encrypted S1-MME traffic using information extracted from the S6a traffic. The method includes load balancing between a plurality of monitoring nodes using the decrypted S1-MME traffic.

The subject matter described in this specification may be implemented in hardware, software, firmware, or combinations of hardware, software and/or firmware. In some examples, the subject matter described in this specification may be implemented using a non-transitory computer readable medium storing computer executable instructions that when executed by one or more processors of a computer cause the computer to perform operations. Computer readable media suitable for implementing the subject matter described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described in this specification may be located on a single device or computing platform or may be distributed across multiple devices or computing platforms.

DETAILED DESCRIPTION

Figure 1:
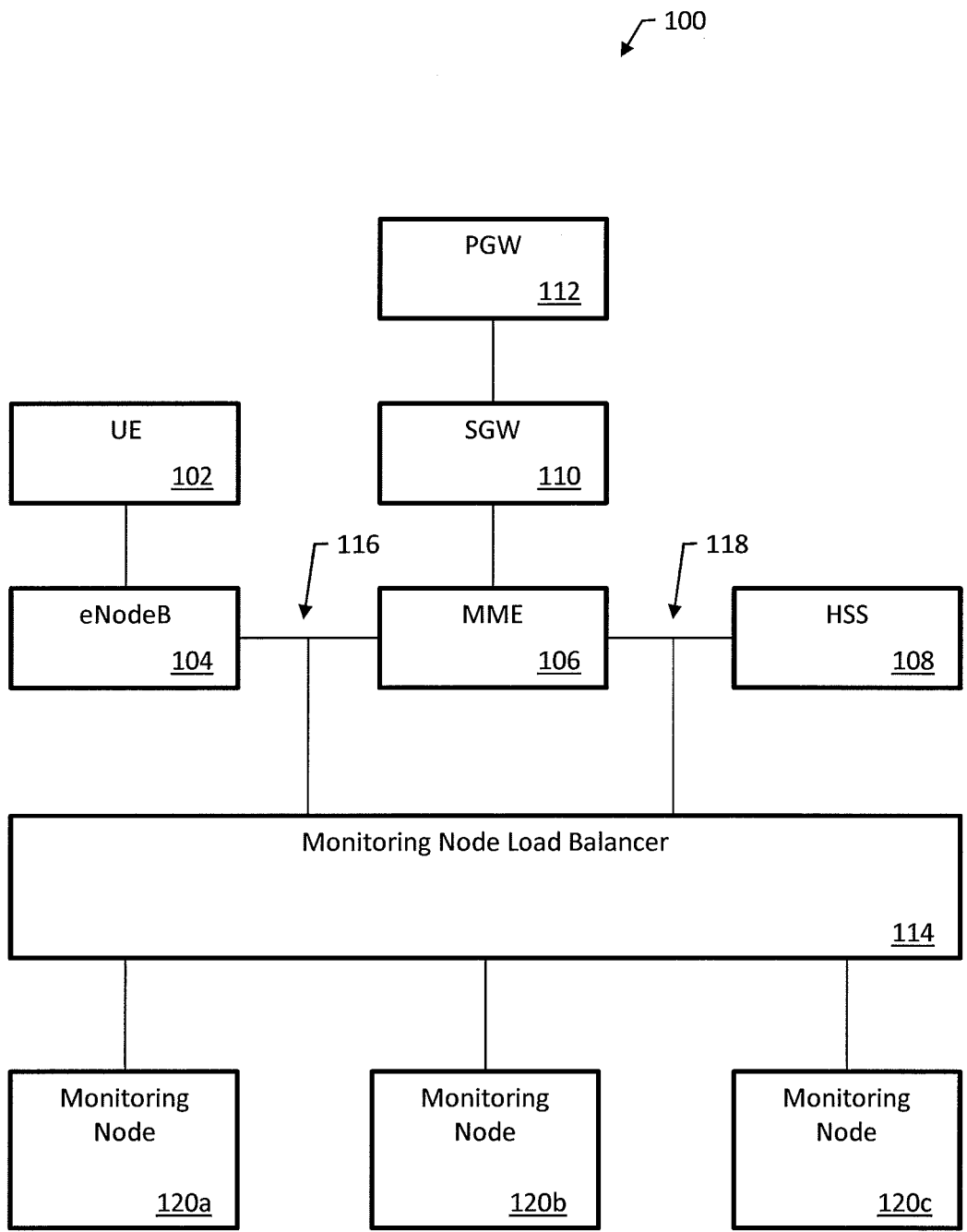
FIG. 1 is a block diagram of an example telecommunications network including at least one user equipment (UE) mobile device.

FIG. 1 is a block diagram of an example telecommunications network 100 including at least one user equipment (UE) mobile device 102 connected to a core network of the telecommunications network. Telecommunications network 100 can be any appropriate type of data communications network, e.g., a long term evolution (LTE) network. The core network can include one or more nodes of a system architecture evolution (SAE) core or evolved packet core (EPC) network or any appropriate network nodes.

UE 102 can be any appropriate type of communications device, e.g., a mobile phone. UE 102 communicates with an evolved node B (eNodeB) 104, e.g., over a radio access network. eNodeB 104 can include any suitable entity (e.g., a base transceiver station (BTS) or a node B) for providing data via an air interface. For example, eNodeB 104 may be an LTE mobile network entity having functionality similar to that of a radio network controller (RNC) and a base station (BS) in 2G networks or an RNC and a Node B in 3G mobile networks.

In some examples, eNodeB 104 may communicate directly with user devices and may be responsible for header compression, ciphering, reliable delivery of packets, admission control, and radio resource management. eNodeB 104 may also communicate with various other modules and/or nodes, e.g., mobility management entity (MME) 106, for performing various control plane signaling functions such as network attaching, UE authentication, bearer channel setup, and mobility management.

MME 106 is configured for performing one or more mobility management functions, such as tracking movements associated with UE 102. In some examples, MME 106 may communicate information (e.g., mobility-related information) to other nodes in or associated with telecommunications network 100. For example, MME 106 may receive registration requests from eNodeB 104 and may communicate with a home subscriber server (HSS) 108 for performing authentication and/or for updating the current location of the subscriber. Additionally, MME 106 may communicate with a serving gateway (SGW) 110.

HSS 108 is configured for maintaining and/or providing one or more subscriber data management functions. HSS 108 may maintain subscriber-related information, such as user identification, control information for user authentication and authorization, location information, and user profile data. For example, HSS 108 may include a database containing details about subscribers associated with UEs, e.g., UE 102, services available to UEs, and the current locations (e.g., current serving nodes) of UEs.

SGW 110 is configured for routing and forwarding data packets. For example, SGW 110 may include functions similar to and/or functions different from a gateway GPRS support node (GGSN) in a 3G network. SGW 110 may include nodes for providing data paths between eNodeB 104 and a packet gateway (PGW) 112. For example, SGW 110 and eNodeB 104 may communicate via an S1-U or other interface and SGW 110 and PGW 112 may communicate via an S5 or S8 interface.

SGW 110 may be configured to act as a mobility anchor for the user or data plane (e.g., during inter-eNB handovers). SGW 110 may manage and store UE contexts, e.g., information associated with an IP bearer service. For example, for an idle state UE, SGW 110 may terminate a downlink data path and initiate paging when downlink data arrives for the UE. SGW 110 may also be used for communicating with other mobile networks, such as 2G/3G networks. SGW 110 may provide charging services and/or policy enforcement for UE 102.

PGW 112 can be configured for communicating with external packet data networks. For example, PGW 112 may be an access point for traffic to UE 102 from a packet network. PGW 112 may perform policy enforcement, packet filtering, charging support, lawful interception, and/or other functions. PGW 112 may also act as a mobility anchor between 3GPP and non-3GPP networks, such as CDMA and WiMAX networks. In some examples, UE 102 may have simultaneous connectivity with multiple PGWs for accessing multiple packet networks.

eNodeB 104 communicates with MME 106 over a S1-MME interface 116, and MME 106 communicates with HSS 108 over an S6a interface 118. A monitoring node load balancer 114 monitors S1-MME traffic on S1-MME interface 116 on a first input port and S6a traffic on S6a interface 118 on a second input port. Monitoring node load balancer 114 distributes tapped traffic from the core network across a number of monitoring nodes 120*a-c*.Each of monitoring nodes 120*a-c* is configured to perform one or more monitoring functions for telecommunications network 100.

The tapped traffic can be, e.g., lawfully intercepted S1-MME traffic or S6a traffic or both. Monitoring node load balancer 114 load balances the tapped traffic across monitoring nodes 120*a-c*, e.g., to prevent any of monitoring nodes 120*a-c* from being over or under utilized. In some examples, monitoring node load balancer 114 extracts subscriber identifiers from the S1-MME traffic or the S6a traffic or both and distributes the tapped traffic across monitoring nodes 120*a-c* using the subscriber identifiers.

For example, monitoring node load balancer 114 can distribute tapped traffic so that each monitoring node 120*a-c* is handling an approximately equal number of subscriber identifiers and traffic associated with those subscriber identifiers. Monitoring node load balancer 114 can use international mobile subscriber identities (IMSIs) to perform the load balancing.

In some cases, UE 102 will cause network traffic to be transmitted in telecommunications network 100 where the subscriber identifier for UE 102 is encrypted. For example, UE 102 may enter an idle state, releasing some but not all network resources for UE 102. When UE 102 later re-enters an active state, network traffic for UE 102 on S1-MME interface 116 may be encrypted. In that case, monitoring load node balancer 114 may not be able to perform load balancing without decrypting the network traffic for UE 102 on S1-MME interface 116 to determine that the traffic is associated with UE 102.

To properly perform the load balancing, monitoring node load balancer 114 can be configured to decrypt some of the S1-MME traffic, e.g., only as much S1-MME traffic as is necessary to perform load balancing across monitoring nodes 120*a-c*. Monitoring node load balancer 114 can extract information from S6a traffic and use the extracted information to decrypt encrypted S1-MME traffic for load balancing across monitoring nodes 120*a-c*.

Figure 2:
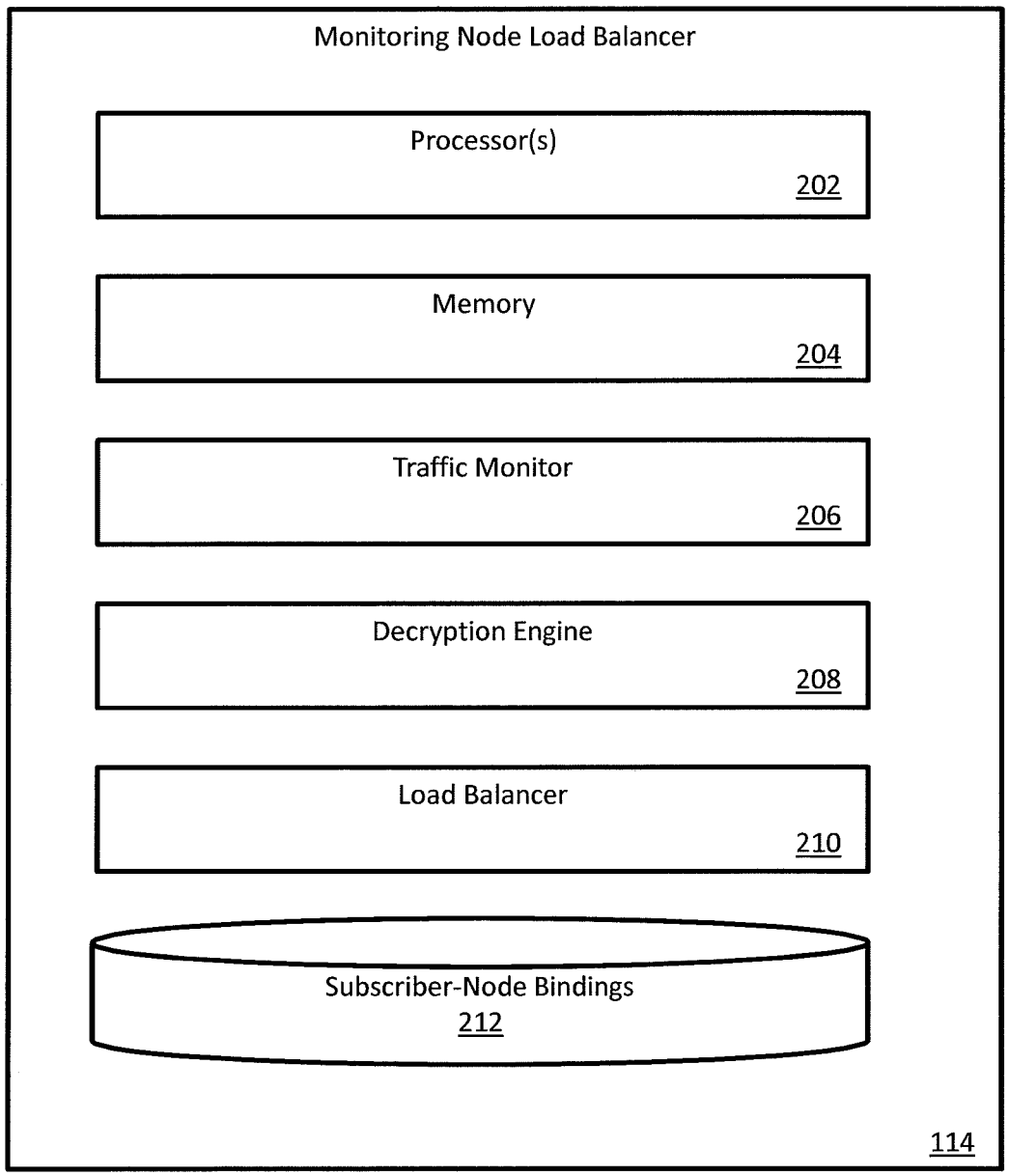
FIG. 2 is a block diagram of an example monitoring node load balancer.

FIG. 2 is a block diagram of an example monitoring node load balancer 114. Monitoring node load balancer 114 includes at least one processor 202 and memory 204. For example, monitoring node load balancer 114 can be implemented as an independent system of one or more computers having packet processors configured to load balance across monitoring nodes. In another example, monitoring node load balancer 114 can be implemented as a process executing in a distributed computing system, e.g., executing on virtual machines or as a containerized load balancer.

Monitoring node load balancer 114 includes a traffic monitor 206 configured for monitoring S1-MME traffic and S6a traffic. Traffic monitor 206 extracts subscriber identifiers from the S1-MME traffic. Traffic monitor 206 also extracts information from the S6a traffic that can be used to decrypt encrypted S1-MME traffic for the purpose of load balancing using subscriber identifiers. Monitoring node load balancer 114 includes a decryption engine 208 configured for decrypting S1-MME traffic using information extracted from S6a traffic. For example, decryption engine 208 can be configured for decrypting the S1-MME traffic using a SNOW 3G based algorithm or an AES based algorithm, as specified by the information extracted from the S6a traffic. In some examples, decryption engine 208 accepts data and key material as inputs and produces decrypted data as an output.

Monitoring node load balancer 114 includes a load balancer 210 configured for load balancing across monitoring nodes. Load balancer 210 distributes tapped traffic by creating bindings between subscribers and monitoring nodes and storing the bindings in a subscriber-node bindings repository 212. When load balancer 210 receives new traffic from a subscriber bound to a monitoring node, load balancer 210 distributes the new traffic to the bound monitoring node. Load balancer 210 can use any appropriate algorithm for distributing the bindings across the monitoring nodes, e.g., round-robin or fair queuing algorithms.

In operation, monitoring node load balancer 114 builds a table with a record for each subscriber attaching to the telecommunications network. Monitoring node load balancer 114 correlates, in each record, a first subscriber identifier extracted from an attachment request in the S1-MME traffic with a second subscriber identifier extracted from an attachment response in the S1-MME traffic. For example, the first subscriber identifier can be an IMSI and the second subscriber identifier can be a globally unique temporary UE identity (GUTI).

Storing both subscriber identifiers can be useful so that load balancer 210 can distribute traffic regardless of whether the traffic is associated with an IMSI or a GUTI. For example, suppose that a UE initially attaches to the telecommunications network and monitoring node load balancer 114 binds the UE to a monitoring node based on the IMSI of the UE, which is extracted from attachment messages by traffic monitor 206 along with the GUTI for the UE. Later, the UE enters an idle state, and some network resources are released in response to the UE entering the idle state. When then UE returns to an active state, the traffic for the UE may contain the GUTI for the UE and not the IMSI. Since monitoring node load balancer 114 has correlated the GUTI with the IMSI, monitoring node load balancer 114 can continue to send tapped traffic for the UE to the monitoring node bound to the UE.

In this case, monitoring node load balancer 114 may need to decrypt the tapped traffic to determine the GUTI. Traffic monitor 206 can store an encryption key extracted from the S6a traffic. Building the table that correlates subscriber identifiers can include storing encryption keys. For example, the encryption key can be a KASME key or a key derived from a KASME key. The KASME key can be extracted from S6a traffic.

To decrypt an encrypted message, monitoring node load balancer 114 locates a corresponding encryption for the encrypted message using a key identifier, e.g., a key set identifier for the encrypted message. Decryption engine 208 then decrypts the encrypted message using the located key. Monitoring node load balancer 114 can then extract the second subscriber identifier from the decrypted message and distribute the encrypted message to the monitoring node that is bound to the second subscriber identifier in the table.

Figure 3:
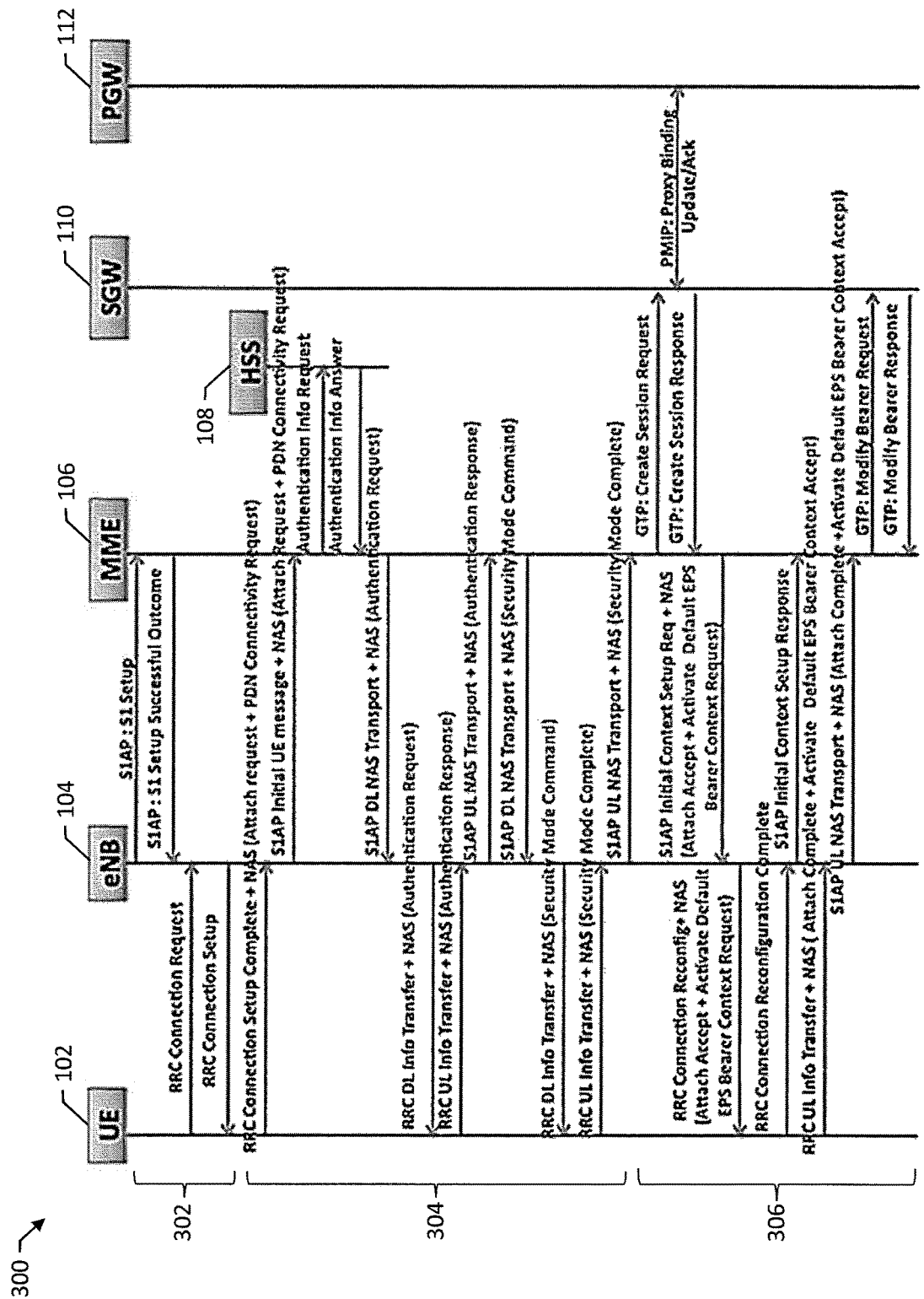
FIG. 3 is a call flow diagram illustrating an example exchange of messages monitored by the monitoring node load balancer.

FIG. 3 is a call flow diagram 300 illustrating an example exchange of messages monitored by the monitoring node load balancer 114. In a first exchange 302 of messages, eNodeB 104 and MME 106 setup a connection and then UE 102 and eNodeB 104 setup a connection. In a second exchange 304 of messages 304, eNodeB 102 initiates an attachment request with MME 106 for UE 102.

During second exchange 304, monitoring node load balancer 114 extracts the IMSI for UE 102 and the GUTI for UE 102 on the S1-MME interface by extracting the IMSI from an attachment request message and extracting the GUTI from a responsive attachment response message. Monitoring node load balancer 114 can then add both the IMSI and the GUTI to a same record in a table for correlating subscriber identifiers for UEs.

Also during second exchange 304, monitoring node load balancer 114 stores the KASME key from HSS 108 by monitoring the authentication info request (AIR) and authentication info answer (AIA) messages exchanged between MME 106 and HSS 108. Monitoring node load balancer 114 can determine which type of decryption to use based on the security mode messages exchange during second exchange 304.

In a third exchange 306 of messages, a connection to a packet network is setup by exchanging messages with SGW 110 and PGW 112. Monitoring node load balancer 114 may be able to appropriately distribute tapped traffic during this exchange using the IMSI. However, if UE 102 later enters an idle state, releasing network resources, and then re-enters an active state, monitoring node load balancer 114 may need to use the stored KASME key to decrypt encrypted messages and extract the GUTI for UE 102 to distribute tapped traffic for UE 102 to the monitoring node bound to UE 102.

Figure 4:
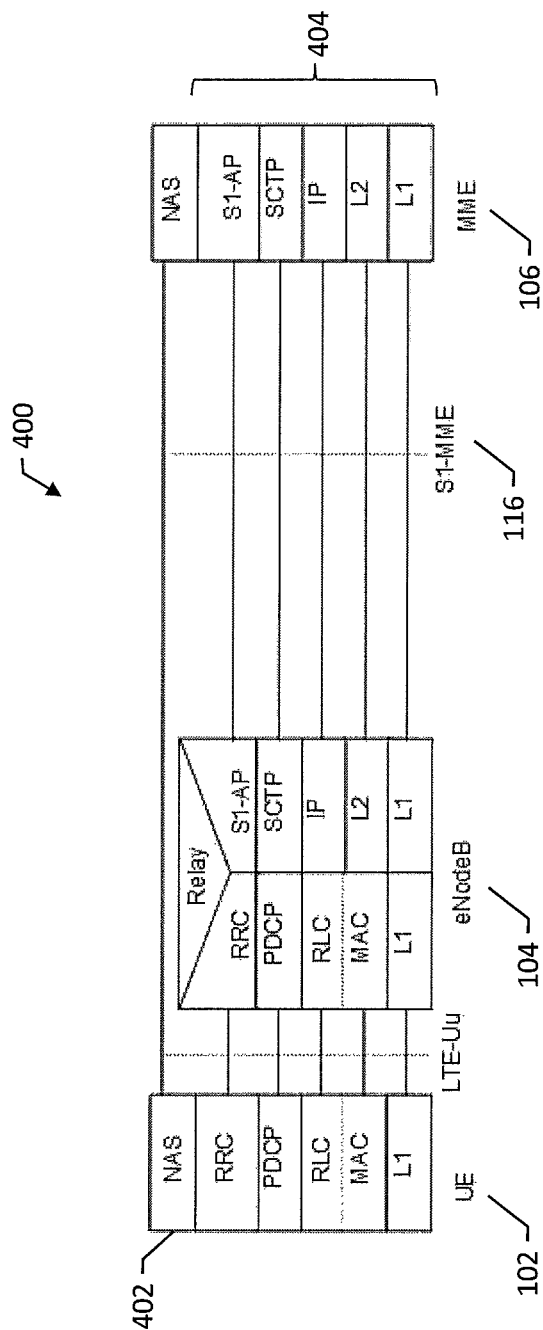
FIG. 4 is a diagram illustrating an example network stack for communications between the UE and the MME.

FIG. 4 is a diagram 400 illustrating an example network stack for communications between UE 102, eNodeB 104, and MME 106. The top layer of the network stack is a non-access stratum (NAS) layer 402. The NAS protocol is used on the control plane between UE 102 and MME 106. NAS layer 402 handles mobility related functions between UE 102 and the core network, such as attachment and tracking area update and authentication and security.

When UE 102 enters an idle state, network resources associate with the layers 404 below NAS layer 402 are released. When UE 102 re-enters an active state, UE 102 may send a service request message. The service request may include the GUTI for UE 102 or a component of the GUTI such as the M-TMSI. Monitoring node load balancer 114 decrypts the service request message, using the decryption scheme for NAS layer 402 and the stored encryption key, to recover the GUTI and distribute traffic for UE 102 to the monitoring node bound to UE 102.

Figure 5:
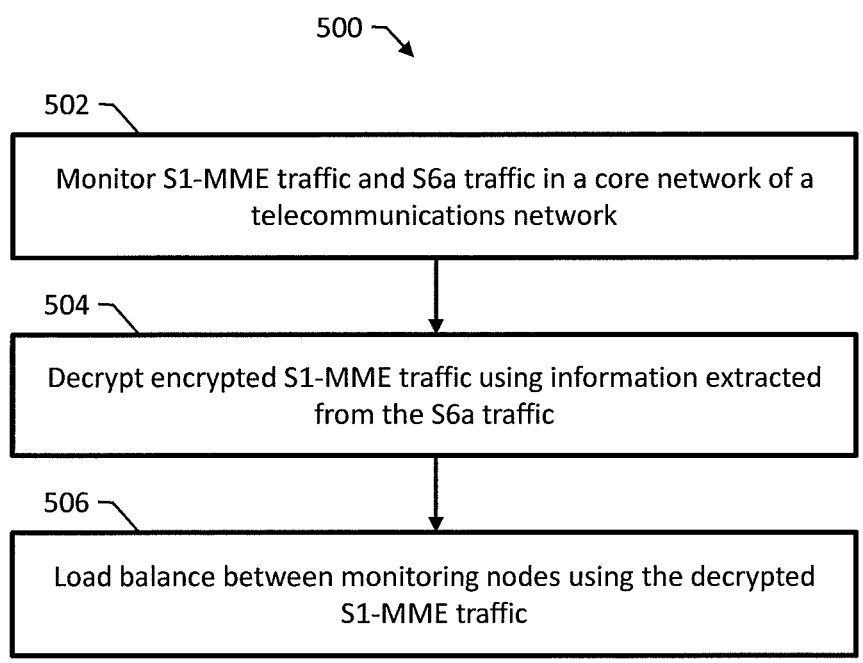
FIG. 5 is a flow chart illustrating an example method for distributing monitored network traffic.

FIG. 5 is a flow chart illustrating an example method 500 for distributing monitored network traffic. Method 500 is performed by a monitoring node load balancer implemented using at least one processor.

The monitoring node load balancer monitors S1-MME traffic and S6a traffic in a core network of a telecommunications network (502). Monitoring the S1-MME traffic and S6a traffic can include extracting subscriber identifiers for subscribers to the telecommunications network.

For example, the monitoring node load balancer can build a table with a record for each subscriber attaching to the telecommunications network. Building the table can include correlating, in each record, a first subscriber identifier extracted from an attachment request in the S1-MME traffic with a second subscriber identifier extracted from an attachment response in the S1-MME traffic. The first subscriber identifier can be an IMSI and the second subscriber identifier can be a GUTI. In general, the first subscriber identifier is a permanent subscriber identifier and the second subscriber identifier is a temporary subscriber identifier.

The monitoring node load balancer decrypts encrypted S1-MME traffic using information extracted from the S6a traffic (504). Building the table can include storing one or more encryption keys extracted from the S6a traffic. The encryption keys are stored on an HSS for UEs attaching to the telecommunications network. For example, the encryption key can be a KASME key or any other appropriate key derived from or associated with the KASME key. Decrypting an encrypted message can include locating a corresponding encryption key using a key identifier for the encrypted message and decrypting the encrypted message using the encryption key.

The monitoring node load balancer load balances between monitoring nodes using the decrypted S1-MME traffic (506). Load balancing can include distributing tapped traffic from the core network across the monitoring nodes using subscriber identifiers, i.e., by binding each subscriber identifier to a monitoring node. For example, the monitoring node load balancer can extract subscriber identifiers from the decrypted S1-MME traffic and use the extracted subscriber identifiers for load balancing.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for distributing monitored network traffic, the method comprising:
at a monitoring node load balancer implemented using at least one processor:
monitoring S1-MME traffic and S6a traffic in a core network of a telecommunications network, wherein monitoring the S1-MME traffic and S6a traffic comprises building a table with a record for each subscriber of a plurality of subscribers attaching to the telecommunications network, and wherein building the table comprises correlating, in each record, a first subscriber identifier extracted from an attachment request in the S1-MME traffic with a second subscriber identifier extracted from an attachment response in the S1-MME traffic;
decrypting encrypted S1-MME traffic using information extracted from the S6a traffic, including extracting, from at least one encrypted message, a respective second subscriber identifier from the encrypted message; and
load balancing between a plurality of monitoring nodes using the decrypted S1-MME traffic, wherein load balancing comprises distributing tapped traffic from the core network across the plurality of monitoring nodes using the first and second subscriber identifiers, and wherein distributing the tapped traffic includes distributing the encrypted S1-MME traffic by selecting a respective monitoring node for the encrypted message by accessing the respective record for the respective second subscriber identifier in the table.

2. The method of claim 1, wherein the first subscriber identifier is an international mobile subscriber identity (IMSI) and the second subscriber identifier is a globally unique temporary UE identity (GUTI).

3. The method of claim 1, wherein building the table comprises storing an encryption key extracted from the S6a traffic.

4. The method of claim 3, wherein the encryption key comprises a Key Access Security Management Entries (KASME) key.

5. The method of claim 3, wherein decrypting the encrypted S1-MME traffic comprises locating, for an encrypted message, a corresponding encryption key using a key identifier for the encrypted message and decrypting the encrypted message using the encryption key.

6. A system for distributed monitored network traffic, the system comprising:
at least one processor; and
a monitoring node load balancer implemented using the at least one processor;
wherein the monitoring node load balancer is configured for:
monitoring S1-MME traffic and S6a traffic in a core network of a telecommunications network, wherein monitoring the S1-MME traffic and S6a traffic comprises building a table with a record for each subscriber of a plurality of subscribers attaching to the telecommunications network, and wherein building the table comprises correlating, in each record, a first subscriber identifier extracted from an attachment request in the S1-MME traffic with a second subscriber identifier extracted from an attachment response in the S1-MME traffic;
decrypting encrypted S1-MME traffic using information extracted from the S6a traffic, including extracting, from at least one encrypted message, a respective second subscriber identifier from the encrypted message; and
load balancing between a plurality of monitoring nodes using the decrypted S1-MME traffic, wherein load balancing comprises distributing tapped traffic from the core network across the plurality of monitoring nodes using the first and second subscriber identifiers, and wherein distributing the tapped traffic includes distributing the encrypted S1-MME traffic by selecting a respective monitoring node for the encrypted message by accessing the respective record for the respective second subscriber identifier in the table.

7. The system of claim 6, wherein the first subscriber identifier is an international mobile subscriber identity (IMSI) and the second subscriber identifier is a globally unique temporary UE identity (GUTI).

8. The system of claim 6, wherein building the table comprises storing an encryption key extracted from the S6a traffic.

9. The system of claim 8, wherein the encryption key comprises a Key Access Security Management Entries (KASME) key.

10. The system of claim 8, wherein decrypting the encrypted S1-MME traffic comprises locating, for an encrypted message, a corresponding encryption key using a key identifier for the encrypted message and decrypting the encrypted message using the encryption key.

11. One or more non-transitory computer readable mediums storing instructions for at least one processor that, when executed by the at least one processor, cause the at least one processor to perform operations comprising:
monitoring S1-MME traffic and S6a traffic in a core network of a telecommunications network, wherein monitoring the S1-MME traffic and S6a traffic comprises building a table with a record for each subscriber of a plurality of subscribers attaching to the telecommunications network, and wherein building the table comprises correlating, in each record, a first subscriber identifier extracted from an attachment request in the S1-MME traffic with a second subscriber identifier extracted from an attachment response in the S1-MME traffic;
decrypting encrypted S1-MME traffic using information extracted from the S6a traffic, including extracting, from at least one encrypted message, a respective second subscriber identifier from the encrypted message; and
load balancing between a plurality of monitoring nodes using the decrypted S1-MME traffic, wherein load balancing comprises distributing tapped traffic from the core network across the plurality of monitoring nodes using the first and second subscriber identifiers, and wherein distributing the tapped traffic includes distributing the encrypted S1-MME traffic by selecting a respective monitoring node for the encrypted message by accessing the respective record for the respective second subscriber identifier in the table.

* * * * *